(12) United States Patent
Chitimbo et al.

(10) Patent No.: US 11,886,433 B2
(45) Date of Patent: Jan. 30, 2024

(54) DYNAMIC DATA BATCHING FOR GRAPH-BASED STRUCTURES

(71) Applicant: RED HAT, INC., Raleigh, NC (US)

(72) Inventors: Manyanda Chitimbo, Créteil (FR); Wojciech Julian Trocki, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 34 days.

(21) Appl. No.: 17/572,076

(22) Filed: Jan. 10, 2022

(65) Prior Publication Data

US 2023/0222125 A1 Jul. 13, 2023

(51) Int. Cl.
*G06F 16/2455* (2019.01)
*G06F 16/28* (2019.01)

(52) U.S. Cl.
CPC ........ *G06F 16/2455* (2019.01); *G06F 16/284* (2019.01)

(58) Field of Classification Search
CPC ............................ G06F 16/2455; G06F 16/284
USPC ........................................................ 707/769
See application file for complete search history.

(56) References Cited

U.S. PATENT DOCUMENTS

| | | | | |
|---|---|---|---|---|
| 7,167,853 B2* | 1/2007 | Zaharioudakis | .. | G06F 16/24539 707/999.005 |
| 8,090,730 B2* | 1/2012 | Shahabi | ............ | G06F 16/24556 707/E17.14 |
| 9,152,523 B2* | 10/2015 | Gargash | ............... | G06F 11/3013 |
| 9,152,532 B2* | 10/2015 | Breternitz | ............ | G06F 11/3495 |
| 10,585,720 B1* | 3/2020 | Kesler | .................. | G06F 16/211 |
| 11,138,192 B1* | 10/2021 | Chintala | ................ | G06F 16/245 |
| 11,188,532 B2* | 11/2021 | Won | .................. | G06F 16/24535 |
| 11,243,947 B1* | 2/2022 | Chintala | ............. | G06F 16/2471 |
| 11,468,079 B1* | 10/2022 | Chintala | ............... | G06F 16/986 |
| 11,500,871 B1* | 11/2022 | Kulkarni | ................ | G06N 20/00 |
| 11,637,849 B1* | 4/2023 | Chen | ....................... | H04L 63/10 726/22 |
| 2007/0079074 A1* | 4/2007 | Collier | ................ | G06F 12/0831 711/146 |
| 2007/0079075 A1* | 4/2007 | Collier | ................ | G06F 12/0822 711/146 |
| 2008/0195452 A1* | 8/2008 | Ponce de Leon | .. | G06Q 10/0635 705/7.12 |
| 2011/0016354 A1* | 1/2011 | Douros | ............... | G06F 11/1471 718/101 |

(Continued)

OTHER PUBLICATIONS

Jhingran, A. (Aug. 23, 2021). "Accessing SQL and NoSQL Databases with a GraphQL API", StepZen, pp. 9.

(Continued)

*Primary Examiner* — Hanh B Thai
(74) *Attorney, Agent, or Firm* — Womble Bond Dickinson (US) LLP (57) ABSTRACT

A data query for data is received that is associated with a first data node managed by a first executable service and a second data node managed by a second executable service. The data query comprises a subquery that is directed to the second executable service for access to the second data node. From the data query, a selection set is determined. The selection set includes the first data node and the second data node. In view of the selection set, a batch access request is generated to the second executable service that retrieves data for the subquery from the second data node in a single access request.

20 Claims, 6 Drawing Sheets

(56) References Cited

U.S. PATENT DOCUMENTS

| | | | | |
|---|---|---|---|---|
| 2013/0057563 | A1* | 3/2013 | Persson | G06F 9/485 |
| | | | | 345/522 |
| 2013/0173596 | A1* | 7/2013 | Roediger | G06Q 10/08 |
| | | | | 707/722 |
| 2014/0047079 | A1* | 2/2014 | Breternitz | G06F 9/5072 |
| | | | | 709/220 |
| 2014/0047084 | A1* | 2/2014 | Breternitz | G06F 9/5083 |
| | | | | 709/221 |
| 2014/0047342 | A1* | 2/2014 | Breternitz | G06F 9/5061 |
| | | | | 715/735 |
| 2015/0149413 | A1* | 5/2015 | Lee | G06F 16/2386 |
| | | | | 707/643 |
| 2015/0339415 | A1* | 11/2015 | Klein | G06F 30/20 |
| | | | | 703/6 |
| 2015/0363461 | A1* | 12/2015 | Behal | G06F 16/245 |
| | | | | 707/722 |
| 2015/0379061 | A1* | 12/2015 | Paraschivescu | G06F 16/219 |
| | | | | 707/695 |
| 2016/0110409 | A1* | 4/2016 | Rao | G06F 16/245 |
| | | | | 707/696 |
| 2016/0162588 | A1* | 6/2016 | Tuchman | G06F 16/3344 |
| | | | | 707/722 |
| 2017/0011093 | A1* | 1/2017 | LeCompte | G06F 16/2471 |
| 2017/0046412 | A1* | 2/2017 | Levy | G06F 16/258 |
| 2017/0068748 | A1* | 3/2017 | Hu | G06F 16/9017 |
| 2017/0103217 | A1* | 4/2017 | Arasu | H04L 9/0819 |
| 2017/0346875 | A1* | 11/2017 | Wells | H04L 67/568 |
| 2019/0361916 | A1* | 11/2019 | Weaver | G06F 16/2365 |
| 2020/0226140 | A1 | 7/2020 | Tamjidi et al. | |
| 2021/0149903 | A1* | 5/2021 | Won | G06F 16/24535 |
| 2021/0248143 | A1 | 8/2021 | Khillar et al. | |
| 2022/0171756 | A1* | 6/2022 | Grosman | G06F 16/2308 |
| 2023/0095814 | A1* | 3/2023 | Sarkar | G06F 11/1451 |
| | | | | 707/641 |

OTHER PUBLICATIONS

Durairaju, P. (Jan. 30, 2020). "Blazing Fast GraphQL Execution with Query Caching & Postgres Prepared Statements" Hasura Inc, pp. 11.

"Working with a GraphQL Dataloader" (2007-2021). pp. 2.

"How to use Batching to Improve Azure SQL Database and Azure SQL Managed Instance Application Performance" (2021), Microsoft Docs, pp. 23.

Trocki, W. (Oct. 8, 2018). "Selecting Database as Data Source for Graphql Server," Medium, pp. 5.

\* cited by examiner

DYNAMIC DATA BATCHING FOR GRAPH-BASED STRUCTURES

TECHNICAL FIELD

Aspects of the present disclosure relate to a microservice architecture, and more particularly, to query processing in microservice architectures.

BACKGROUND

Microservice architecture is an architectural style of a computing system that structures an application as a collection of services. The services can be independently developed, tested and deployed by different teams. Microservice architectures enable the deployment of large, complex applications at a rapid pace.

Application programming interfaces (APIs) are sometimes used to provide access to microservice architectures. GraphQL is an example of such an API, and exposes services via connected data graphs. GraphQL provides a way to query and/or modify data provided by the services utilizing a standard interface.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In a microservice architecture, an application may be made up of multiple services. Each of the services may include different types of data and corresponding service schemas. The service schemas may correspond to the organization or structure of the data for the corresponding services. To acquire data from the various services of the architecture, a client device may utilize a query language application programming interface (API), such as GraphQL™, to query the services for particular data. For example, a client device may utilize a query language API to query services to access data associated with a data store of the application.

Graph-oriented APIs, such as GraphQL, may allow for a graph oriented approach to data visualization, access, and retrieval. Graph-oriented APIs may provide the ability to separate the structure of the data storage from the data itself. Rather than accessing data based on its known location/structure (e.g., as a column of a row of a known table), the field itself can be referenced and queried, in view of relationships between the data elements. Thus, the data exposed by the graph-oriented API may be visualized as a node in a graph.

In a conventional microservice architecture, the query language API acts as a gateway on the edge of backend services. When references are made to nodes in the graph, separate functions may be utilized to retrieve each individual node. These retrievals of the various nodes may be made independently of one another, unlike in some traditional SQL-based relational databases. One issue with such an approach is that the parallel nature of the node access in a graph-oriented API may lead to the same data element being retrieved multiple times. As a result, as the data set becomes large and/or the queries become more complex, the performance of the API is degraded. Some conventional efforts to address this inefficiency attempt to preload some of the underlying, interconnected data. Such methods, however, typically are implemented via operations that are constructed in advance based on knowledge of the data structure. Such a solution not only reduces the benefits of separating the data storage structure from the data itself, but also tends to be inflexible and difficult to adapt if/when the underlying data structure changes.

Aspects of the disclosure address the above-noted and other deficiencies by utilizing information about the graph structure exposed by the graph-oriented API to automatically build aggregation functions that provide a reduced number of node requests. Aspects of the disclosure described herein may recognize, based on the structure of an incoming query and the graph itself, that the incoming query is likely to face inefficiency issues due to multiple accesses of a same node. Aspects of the present disclosure may avoid this inefficiency by reformulating the query to access the node in a batching method, using a single function to gather data that would otherwise take multiple functions and/or requests. The single query may be built based on the type of node that is being requested, the fields (node elements) that have been requested by the incoming query, and/or the arguments given as part of the incoming query. As used herein, the term "and/or" includes any and all combinations of one or more of the associated listed items.

For example, some embodiments of the disclosure may analyze an incoming data query that includes a main query associated with a first data store (and a first associated service) as well as a subquery that is associated with a second data store (and a second associated service). The subquery may include accesses to data nodes that could be inefficiently executed multiple times for each of the return values of the main query. Some embodiments of the present disclosure may, prior to executing the data query, generate a selection set of the data query that identifies the nodes incorporated as part of the subquery, as well as an argument set that includes any qualifications or limitations of the nodes being accessed by the selection set. In view of the selection set and the argument set, a batch access request can be developed that gathers the data being requested for the subquery into a single access request. Thus, the potentially inefficient access that might otherwise be caused by the subquery is reduced and/or avoided.

Embodiments of the disclosure describe an improved microservice architecture by providing the ability to build graph-based systems on top of a relational and/or non-relational database without involving an inefficient process of manual mapping and batching the data sources, as the batching is performed dynamically (e.g., automatically and/or without additional user input being required). The embodiments described herein may utilize reduced resources and provide a more flexible mechanism for querying stored data utilizing a microservice architecture.

Figure 1:
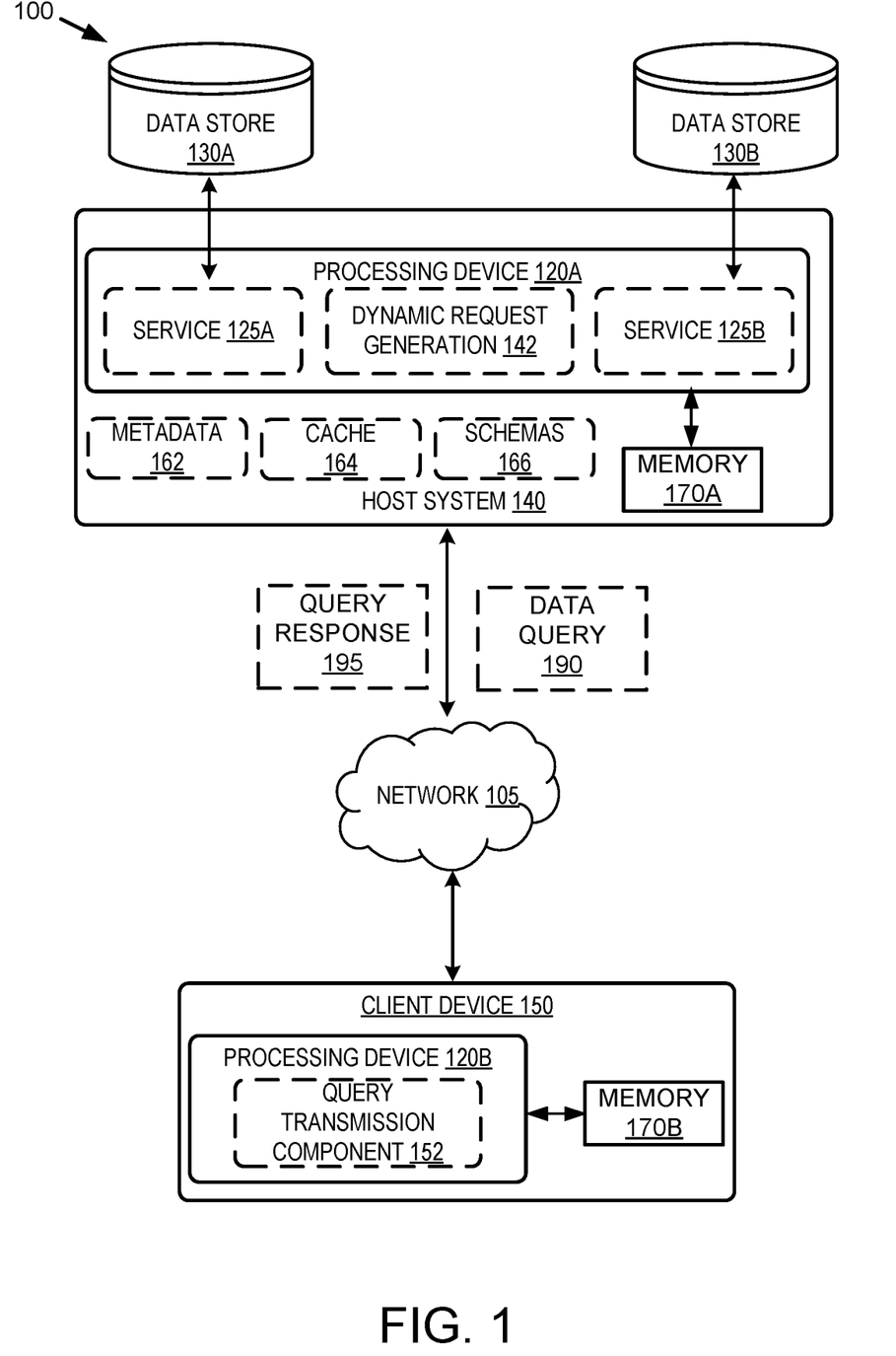
FIG. 1 is a block diagram that illustrates an example microservice architecture, in accordance with some embodiments of the present disclosure.

FIG. 1 is a block diagram that illustrates an example microservice architecture 100, in accordance with some embodiments of the present disclosure. The microservice architecture 100 may include host system 140 and client device 150.

As illustrated in FIG. 1, microservice architecture 100 includes host system 140 that includes computing processing devices 120A, memory 170A, and data stores 130A, 130B. The microservice architecture 100 may also include a client device 150 that includes a computing processing device 120B and memory 170B.

FIG. 1 and the other figures may use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral.

Processing device 120 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 120 may also include one or more special-purpose processing devices such as an application specific integrated circuit (ASIC), a field programmable gate array (FPGA), a digital signal processor (DSP), network processor, or the like. Different ones of the host system 140 and client device 150 may have different types of processing device 120. It should be noted that although, for simplicity, a single processing device 120 is depicted in each of the host system 140 and client device 150 depicted in FIG. 1, other embodiments of host system 140 and client device 150 may include multiple processing devices, storage devices, or other devices.

Memory 170 may include volatile memory devices (e.g., random access memory (RAM)), non-volatile memory devices (e.g., flash memory) and/or other types of memory devices. In certain implementations, memory 170 may be non-uniform access (NUMA), such that memory access time depends on the memory location relative to processing device 120.

The host systems 140 and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of the microservice architecture 100.

The data stores 130A, 130B may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host system 140 and client device 150 may include any suitable type of computing device or machine that has a programmable processor including, for example, server computers, desktop computers, laptop computers, tablet computers, smartphones, set-top boxes, etc. In some examples, host system 140, and client device 150 may comprise a single machine or may include multiple interconnected machines (e.g., multiple servers configured in a cluster). Host system 140 and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Processing device 120A of host system 140 may execute services 125A and 125B of an application, respectively. In some embodiments, service 125A and/or service 125B may be executed within containers that serve as isolated execution environments for service 125A and/or service 125B. In embodiments, service 125A and/or service 125B may be executed by one or more virtual machines (VMs) that are software implementations of a machine that executes programs as though it was an actual physical machine. In some embodiments, service 125A and service 125B may utilize different frameworks and/or programming languages. Although illustrated as being executed by a single host system 140, in some embodiments, service 125A and service 125B may be executed by different host systems. Additionally, although illustrated as having two services 125A, 125B, embodiments of the present disclosure may include a microservice architecture having any number of host systems 140 executing any number of services 125.

In some embodiments, the processing device 120B of the client device 150 may execute a query transmission component 152. The query transmission component 152 may generate a data query 190 for data associated with service 125A and/or service 125B (or any other services executed by microservice architecture 100). The query transmission component 152 may transmit the data query request 190 to the services 125A, 125B of the host system 140.

The services 125 may be associated with data of the data stores 130 coupled to the host system 140. For example, service 125A may be associated with data store 130A and service 125B may be associated with data store 130A. Portions of data query request 190 directed to data provided by data store 130A may be routed to service 125A by the processing device 120A of host system 140. Portions of data query request 190 directed to data provided by data store 130B may be routed to service 125B by the processing device 120A of host system 140. As an example, data store 130A may be a first table of a database (e.g., an SQL-based relational database) and data store 130B may be a second table of a database. A portion of data query 190 directed to the first table of the database may be handled by service 125A and a portion of data query 190 directed to the second table of the database may be handled by service 125B, and query response 195 may be generated from the data gathered by the services 125. As another example, data store 130A may include data provided by a non-database oriented data store, such as a call to an API, and data store 130B may include data provided a table of a database. In response to a data query 190, the service 125A may execute the API to provide a first portion of a query response 195 to the data query 190 and the service 125B may access the table of the database to provide a second portion of the query response 195 to the data query 190.

In some embodiments, the data query 190 may be a graph-oriented query. That is, the data query 190 may reference the data of the data stores 130 as nodes of a graph. The services 125 may translate the graph-oriented query into access requests of the data stores 130 based on the structure of the data stores 130. For example, if the data store 130 is a SQL-based database, the services 125 may allow for the graph-based data query 190 to be translated to an SQL-based access method that is transparent to the client device 150.

In some embodiments, processing device 120A of the host system 140 may execute a dynamic request generation component 142 in response to the data query request 190 of the client device 150. The dynamic request generation component 142 may receive service schemas 166 from service 125A and service 125B, respectively. The service schemas 166 may describe an arrangement of the data managed by the services 125. For example, the schema 166 for service 125A may describe an arrangement of the data on data store 130A and the schema 166 for service 125B may describe an arrangement of the data on data store 130B. The dynamic request generation component 142 may generate metadata 162 based on the schemas 166. The metadata 162 may be collected during build time (when supported) and/or boot time of the microservice architecture 100.

Utilizing the metadata 162, the dynamic request generation component 142 may analyze the incoming data query 190 to determine whether a reduction in a number of accesses to the services 125 is possible. For example, the dynamic request generation component 142 may determine that a plurality of requests to the service 125B may be reduced so a single access request that batches one or more pieces of data from data store 130B. In some embodiments, the data from data store 130A and/or 130B that are generated as a result of the accesses by the services 125 may be cached in cache 164 on the host system 140. In some embodiments, the dynamic request generation component 142 may be provided as part of a GraphQL API interface and the services 125 may be resolver services of the GraphQL API interface. In GraphQL, a resolver is a function that resolves a value for a type or field in a GraphQL schema.

Further details regarding dynamic request generation component 142 will be discussed herein with respect to the provided figures.

Figure 2:
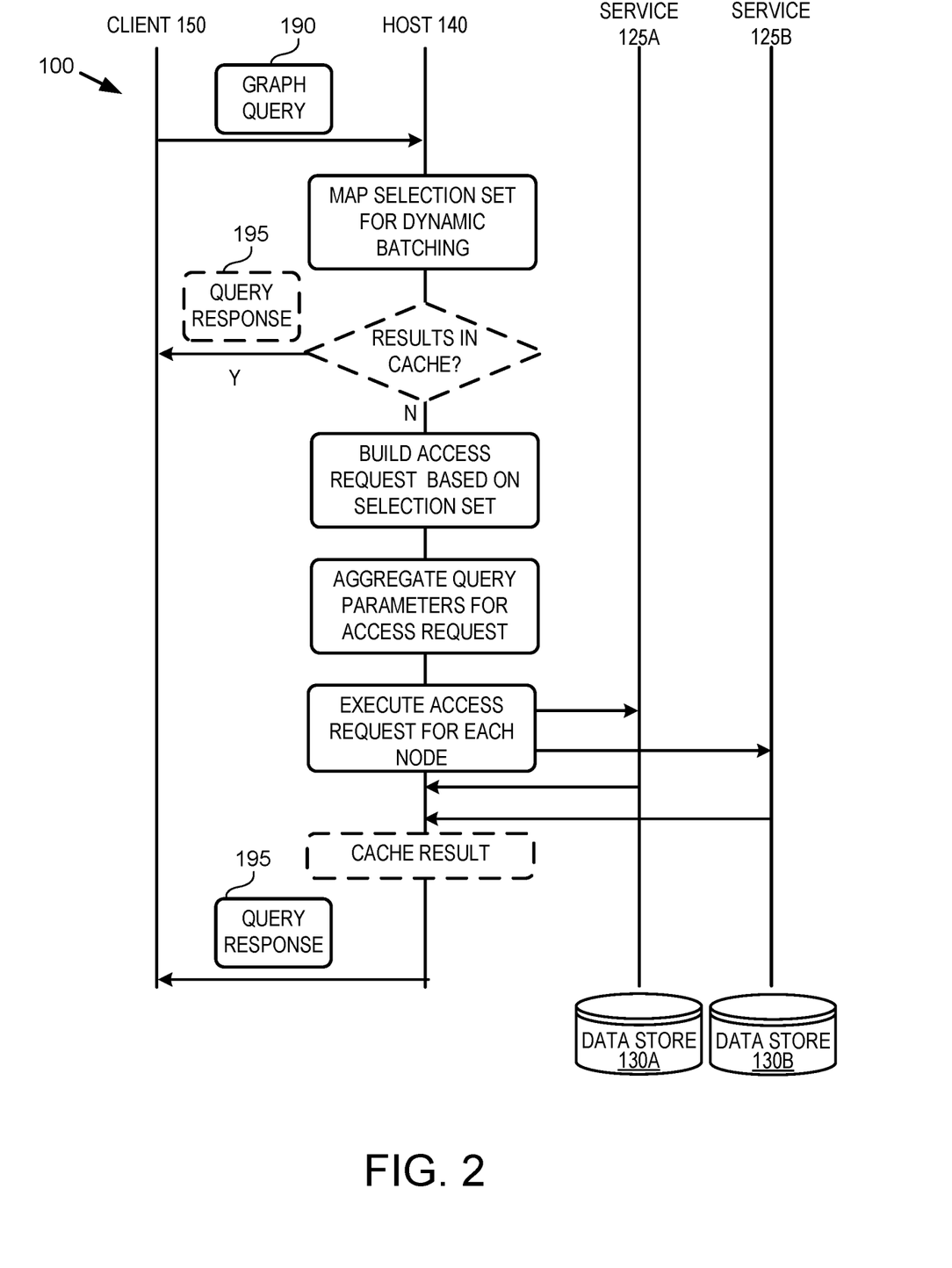
FIG. 2 is a flow diagram of the microservice architecture utilizing a dynamic request generation component, in accordance with some embodiments of the present disclosure.

FIG. 2 is a flow diagram of the microservice architecture 100 utilizing a dynamic request generation component 142, in accordance with some embodiments of the present disclosure. A description of elements of FIG. 2 that have been previously described will be omitted for brevity.

Referring to FIG. 2, a client device 150 may provide a data query 190 to a host system 140. In some embodiments, the data query 190 may be a graph-based data query 190. In some embodiments, the data query 190 may be directed to a plurality of services 125A, 125B of the microservice architecture 100. The data query 190 may map to one or more nodes of a graph of data provided by the data stores 130 of the microservice architecture 100. For example, the data query 190 may be GraphQL query, the services 125A, 125B may be resolvers of the GraphQL API, and one or more of the data stores 130 may be relational databases (e.g., SQL-based), though the embodiments of the present disclosure are not limited thereto. In some embodiments, one or more of the data stores 130 may be non-relational databases (e.g., NoSQL-based), or any form of data storage/retrieval (e.g., API-based).

In response to the data query 190, the host system 140 may execute a dynamic request generation component 142 that maps common nodes of the data query 190. For example, the host system 140 may determine a selection set and an argument set of the data query 190. The selection set of the data query 190 refers to the various nodes that are being accessed by the data query 190. The nodes may be data provided by the services 125 from the data stores 130. As an example, if the data stores 130 are relational databases, the selection set may correspond to columns and or tables of the database. The argument set of the data query 190 refers to any criteria for the data retrieved from the selection set being requested by the data query 190 (e.g., qualifications or limitations that are placed on the queried data). As an example, if the data stores 130 are relational databases, the argument set may correspond to predicates of an SQL query accessing the relational databases.

The dynamic request generation component 142 may map common nodes for batching to identify unique data entities that are requested in the data query 190. In some embodiments, the incoming data query 190 may query the fixed sets of data entities in different parts of the graph schema provided for the microservice architecture 100. In this part of the workflow, the requested node types may be uniquely identified so that they can be resolved in one batch. Moreover, subqueries of the data query 190 may be examined to identify the query selection sets so that a resulting backend access request only requests the information necessary to fulfill the request of all requested data entities.

In some embodiments, to determine the selection set of the data query 190, the dynamic request generation component 142 may analyze the structure of the data stores 130 (e.g., using the metadata 162) to determine that the data query 190 may generate a plurality of accesses to a single service 125 based on the microservice architecture 100. An example of the query structure analyzed by the dynamic request generation component 142 is illustrated in FIG. 3.

Figure 3:
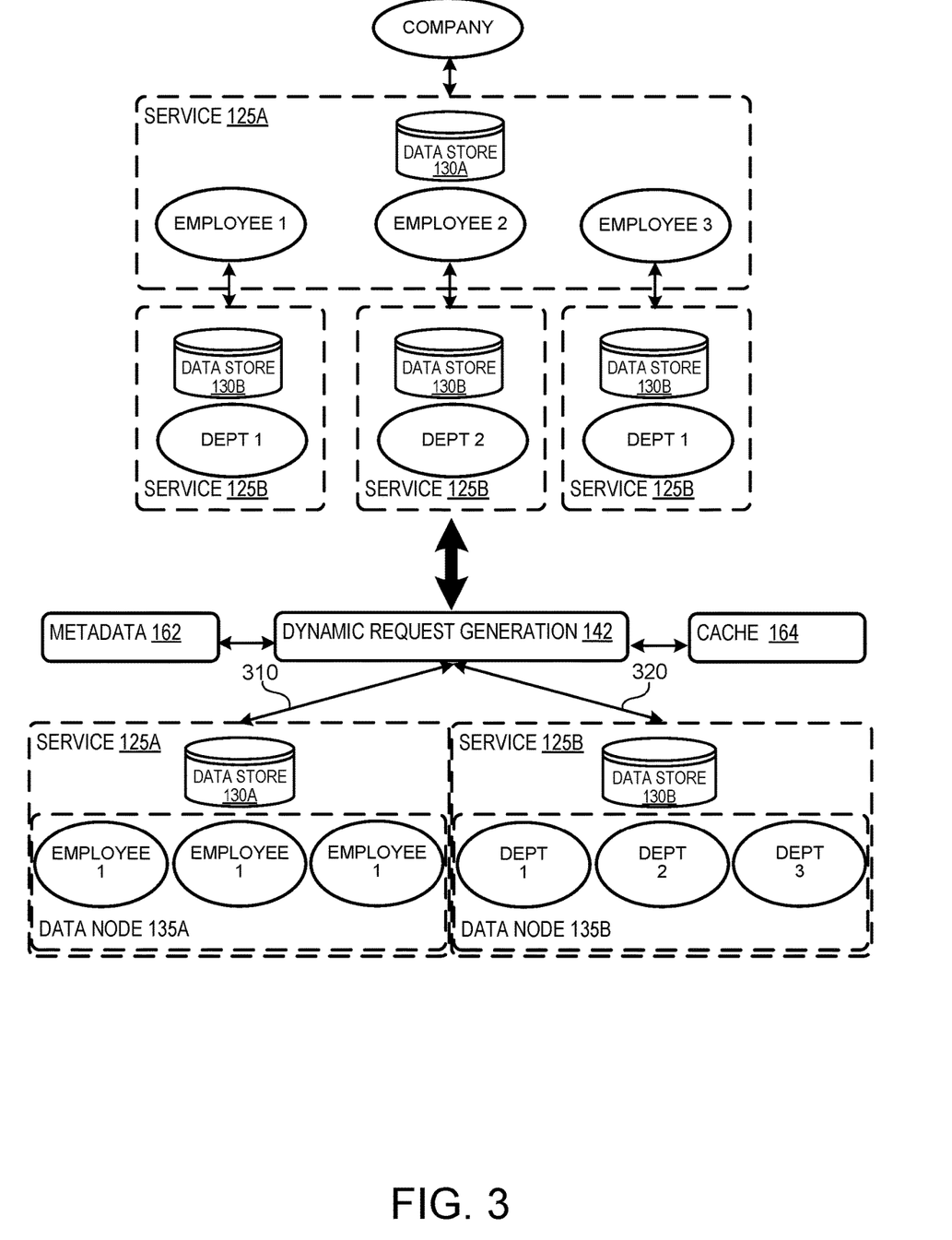
FIG. 3 is an illustration of an example of a dynamic request generation operation of the microservice architecture, in accordance with some embodiments of the present disclosure.

FIG. 3 is an illustration of an example of a dynamic request generation operation of the microservice architecture 100, in accordance with some embodiments of the present disclosure. FIG. 3 illustrates, for example purposes only, a potential graph-based query that may be made to an example database, where the query is improved according to some embodiments of the present disclosure. The components of FIG. 3 are provided merely as an example to describe the operations of the dynamic request generation component 142 and are not intended to limit the scope of the present disclosure.

Referring to FIG. 3, an example structure is shown in which a first service 125A and a second service 125B respectively provide access to a first data store 130A and a second data store 130B. The first data store 130A contains an employee database as a first data node 135A. The employee table and/or database may include a plurality of rows, each row corresponding to an employee of the company. The employee row may include a field (e.g., a column) for a department in which the employee works.

The second data store 130B contains a department database as a second data node 135B. The department table and/or database may include a plurality of rows, each row corresponding to a department of the company. The department row may include a field (e.g., a column) for a name of the department.

In some embodiments, one or more of the first data store 130A and the second data store 130B may be relational databases. A graph-based API (e.g., GraphQL) may be provided to represent the data of the data stores 130 as nodes (e.g., first data node 135A and second data node 135B) in a graph. For example, a first data node 135A of the graph may be the employee and a second data node 135B of the graph may be the department. Thus, the first service 125A of the microservice architecture 100 may be responsible for handling accesses to the employee node 135A (by way of the employee table and/or database) and the second service 125B of the microservice architecture 100 may be responsible for handling accesses to the department node 135B (by way of the department table and/or database). The first and second data stores 130A, 130B are illustrated as relational databases merely for convenience and the embodiments of the present disclosure are not limited to this configuration. In some embodiments, the first and second data stores 130A, 130B may be different types of data storage. For example, the first data store 130A may be a relational table and/or database (e.g., a database of employees accessible via SQL) and the second data store 130B may be an API (e.g., an API that returns information for a particular department). In some embodiments, one or more of the first and second data stores 130A, 130B may be non-relational databases (e.g., NoSQL-based databases). For example, the first data store 130A may be a relational database and the second data store 130B may be a non-relational database. By using the services 125, the data query 190 can be abstracted from the type and/or structure of the data stores 130.

An example of a graph-based query that may be made to the data stores 130 is included below:

```
query {
  employee {
    name
    dept {
      id
      name
    }
  }
}
```

The above query access the data stores 130 to request each of the employees (their name) of the company and each department (including id and name) for each of the employees. The "dept" portion of the query may be described as a subquery, as it may be performed for each portion of the main query (the employee). Because employees (e.g., the first data node 135A) are handled by the first service 125A (and the first data store 130A) independently of the departments (e.g., the second data node 135B) handled by the second service 125B (and the second data store 130B0, inefficiencies can result, as illustrated in FIG. 3.

For example, responsive to the above example query, the dynamic request generation component 142 may recognize that a number of accesses to the services 125 may be made by a subquery of the data query 190. For example, the first service 125A may query the first data store 130A to retrieve the contents of the employee database (e.g., the first data node 135A). This may result in "EMPLOYEE 1," "EMPLOYEE 2," and "EMPLOYEE 3," as illustrated in FIG. 3.

The dynamic request generation component 142 may recognize that, absent a modification of the query, the second service 125B may be called as a subquery for each result provided by the first service 125A. Thus, the second service 125B may conventionally be called three additional times, once for "EMPLOYEE 1," resulting in department information for "EMPLOYEE 1" ("DEPT 1"), once for "EMPLOYEE 2," resulting in department information for "EMPLOYEE 2" ("DEPT 2"), and once for "EMPLOYEE 3," resulting in department information for "EMPLOYEE 3" ("DEPT 1"). Absent modification of the data query, the second service 125B may be called multiple times.

Referring back to FIG. 2 in light of the example of FIG. 3, the dynamic request generation component may determine the selection set of the data query 190 based on the common nodes (e.g., first and second data nodes 135A, 135B) accessed by the data query 190 and/or the structure of the data query 190 (e.g., based on subqueries within the data query 190). For example, in the example of FIG. 3, the common nodes may be the employee node (e.g., the first data node 135A provided by the first service 125A) and the department node (e.g., the second data node 135B provided by the second service 125B). A determination of the common nodes may, in some embodiments, be based on metadata 162 that is generated by schemas 166 provided by the services 125 describing the data stores 130.

In some embodiments, the argument set of the data query 190 may be determined by analyzing the data query 190 to determine if additional criteria are applied to the data nodes 135A, 135B of the data query 190. For example, a query of the data nodes 135A, 135B provided in the example of FIG. 3 may further limit the request to employees of a particular age or years of service. The argument set may be used to determine if the common data nodes 135A, 135B of the selection set for the data query 190 may be further expanded or reduced.

Still referring to FIG. 2, as an optional step, the host system 140 may determine whether the data requested by the data query 190 (e.g., the common data nodes 135A, 135B) is present in a cache 164 (see FIG. 1) of the host system 140. If the data is present in the cache 164, the data may be accessed from the cache 164 and returned as the query response 195.

In some embodiments, a portion of the data requested by the data query 190 may be present in the cache 164 but not the full amount. In such a case, the selection set determined by the dynamic request generation component 142 may be modified to remove those portions of the selection set that are already present in the cache 164.

Once the selection set has been determined, the dynamic request generation component 142 of the host system 140 may build a batch access request based on the selection set. The batch access request may modify multiple individual accesses to a service 125 for a given data node into a single batch access of the data node. The batch access request may be built based on the identified selection set and the metadata 162, which enables the dynamic request generation component 142 to dynamically pick and use the service 125 (and associated data store 130) for a particular requested data node.

An example of this batch access request is illustrated in FIG. 3. Referring to the example of FIG. 3, the dynamic request generation component 142 may determine, as previously discussed, that the data query 190 may result in a plurality of calls to a particular service 125. For example, as described in the upper portion of FIG. 3, the provided data query 190 may result in three separate queries to the department data node 135B by way of the second service 125B, once for each of the employees from the employee data node 135A returned by the first service 125A.

To generate the batch access request, the dynamic request generation component 142 may generate a selection set comprising the employee node 135A and the department node 135B. The dynamic request generation component 142 may generate a batch access request that includes a first request 310 to the first service 125A (e.g., to access the employee node 135A) and a second request 320 to the second service 125B (e.g., to access the department node 135B). The dynamic request generation component 142 may recognize that, rather than calling the second service 125B once for each return value from the first service 125A, a single call to the second service 125B may be made to retrieve all of the data from the second data node 135B managed by the second service 125B (e.g., the department node 135B), and the returned data can be analyzed with respect to return data from the first data node 135A managed by the first service 125A (e.g., the employee node 135A), resulting in a reduction of the number of accesses to the second service 125B. In some embodiments, the first request 310 to the first service 125A and the second request 320 to the second service 125B may be performed concurrently.

Referring back to FIG. 2, the dynamic request generation component 142 may aggregate query parameters for the batch access request. Because individual access requests of the batch access request are being executed independently of one another, the batch access request may be modified to include more and/or all of the data of the selection set. In some embodiments, the batch access request may be further modified based on the argument set of the data query 190 (e.g., to include the restrictions of the data query 190 to further limit the data being accessed). For each common data node 135A, 135B, the argument set and selection set may be aggregated to be able to make one batch query to the data store 130 using the given information.

Because the batch request is generated automatically (e.g., from the metadata 162), it avoids unnecessary manual batching to achieve the same result. Moreover, by extracting the schema data 166 from the services 125 to generate the metadata 162, the dynamic request generation component 142 can determine the mapping between the data nodes 135A, 135B serviced by the graph and the underlying data structure automatically. If a structure of the data stores 130 changes, then the mapping can change dynamically. Thus, a translation from a graph-oriented query to a non-graph oriented query (e.g., to a SQL database, NoSQL database, or other form of data storage) can be made dynamically without manual input. As a result, the dynamic request generation component 142 reduces a complexity of the microservice architecture 100 and reduces an amount of executable code that must be provided to provide a graph-oriented data structure. This benefit leads to a reduction in resources required to implement a graph-oriented database, as it allows for a graph-oriented front-end to be provided on existing data sources, such as SQL databases.

Once the batch access request is generated, it may be executed for each data node 135 in the selection set. The batch access request may include access requests to each service 125 associated with the data nodes 135 of the selection set. In some embodiments, the access requests to each service 125 (e.g., to first service 125A and second service 125B) may be performed concurrently.

For example, referring to the example of FIG. 3, in the query scenario in which multiple requests are made to the second service 125B, each access request is for a particular employee (e.g., "EMPLOYEE 1," "EMPLOYEE 2," etc.). As a result, the data retrieved by the second service 125B is limited to those employees that are returned by the first service 125A. This results in only departments "DEPT 1" and "DEPT 2" being returned.

The use of the batch access request may result in a different set of data being retrieved. Because the batch access request for both services 125 are executed independently of each other, the batch access request may request all of the records from the data node 135A served by the first service 125A (e.g., all of the employees) as well as all of the records from the data node 135B served by the second service 125B (e.g., all of the departments). Thus, the batch request may return additional data (e.g., "DEPT 3"). The data returned from the first and second services 125A, 125B may be analyzed to determine that some of the information (e.g., "DEPT 3") returned by one of the services 125 may not be needed, as it may not be a part of an intersection between the data nodes 135 of the retrieved selection set (as potentially modified by the argument set).

Referring back to FIG. 2, once the data is returned, the data returned by the services 125 may optionally be cached, if a cache 164 is present. The cache entries may be given a time to live based on a defined duration. Once the time to live has expired, the cache entries may be removed from the cache 164.

A query response 195 may be generated based on the data returned by the service 125 and directed to the client device 150. For example, the dynamic request generation component 142 may process the data returned by the batch access query to determine the data that matches the data query 190. Referring to the example of FIG. 3, the batch access query to the second service 125B may return all of the departments, and the dynamic request generation component 142 may determine that "DEPT 1" and "DEPT 2" of the data from the batch request match data from the batch request of the first service 125A (e.g., "EMPLOYEE 1," "EMPLOYEE 2," and "EMPLOYEE 3"). That is to say that while "DEPT 3" was also returned by the batch access request to the second service 125A, it may not be needed. This extra data access may still provide an improvement in query execution over a plurality of more targeted requests to the second service 125B. The extra data may also be cached, when cache 164 is present, and may be used in subsequent queries for a performance improvement.

The embodiments described herein provide an improved access mechanism that allows for graph-based access on non-graph-based data stores 130 without additional information being required as to the structure of the data. The batch access request described herein may dynamically adjust to the underlying structure of the data store 130, allowing for more efficient queries that dynamically scale if the underlying data store 130 is changed. Moreover, the batching of access to the services 125 may yield greatly improved performance as the size of the database grows. For example, referring to the query described with respect to FIG. 3, if the employee database were to grow to 10,000 employees, the described subquery of the department would be performed 10,000 times, once for each employee. The dynamic request generation component 142 described herein may provide the same information with a single query to the department database, and could be performed automatically and dynamically without requiring advance knowledge of the database structure. The mechanism described herein also adjusts for different types of underlying databases. For example, if one of the data stores 130 is an SQL database, but the other data store 130 is not, traditional SQL optimization mechanisms may not be available for queries that span both data stores 130. Embodiments of the present disclosure are agnostic as to the structure of the underlying data store 130.

Figure 4:
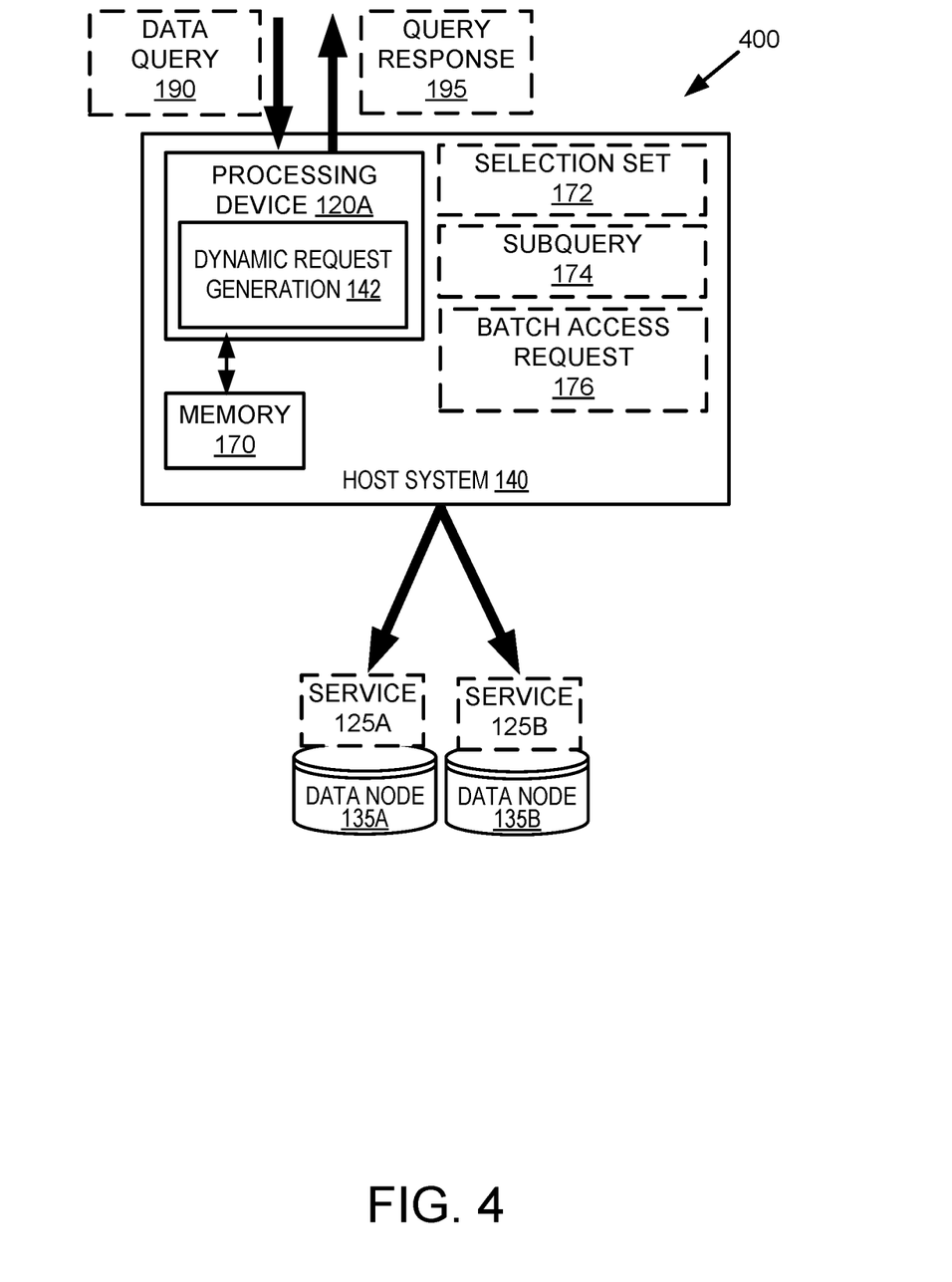
FIG. 4 is a component diagram of an example of a device architecture, in accordance with some embodiments of the present disclosure.

FIG. 4 is a component diagram of an example of a device architecture 400, in accordance with one or more aspects of the disclosure. The device architecture 400 includes host system 140, processing device 120A, and memory 170 of FIG. 1 and, as such, a duplicate description thereof will be omitted.

The host system 140 may receive a data query 190 from one or more client devices 150, such as the data query 190 and the client device 150 described herein with respect to FIGS. 1-3. The data query 190 may query data from at least a first data node 135A (e.g., of a first data store 130A) managed by a first executable service 125A and a second data node 135B (e.g., of a second data store 130B) managed by a second executable service 125B. The host system 140 may analyze, e.g., by the processing device 120A, the data query 190 utilizing a dynamic request generation component 142 to determine a selection set 172 of the data query 190 as described herein with respect to FIGS. 2 and 3.

In some embodiments, the dynamic request generation component 142 may further identify a subquery 174 that is associated with the data query 190 as described herein with respect to FIGS. 2 and 3. The dynamic request generation component 142 may generate a batch access request 176 in view of, at least in part, the selection set 172 as described herein with respect to FIGS. 2 and 3. The batch access request 176 may be transmitted to the first service 125A and/or the second service 125B.

The results of the batch access request 176 may be analyzed by the dynamic request generation component 142 to generate a query response 195. In some embodiments, the query response 195 may be provided to a client device 150 in response to the data query 190. It should be noted that the data query 190, the query response 195, the selection set 172, the subquery 174, and the batch access request 176 are shown for illustrative purposes only and are not physical components of host system 140.

The host system 140 may include a memory 170 that is operatively coupled to processing device 120A. In embodiments, memory 170 may include volatile memory devices (e.g., random access memory (RAM)), non-volatile memory devices (e.g., flash memory) and/or other types of memory devices.

Figure 5:
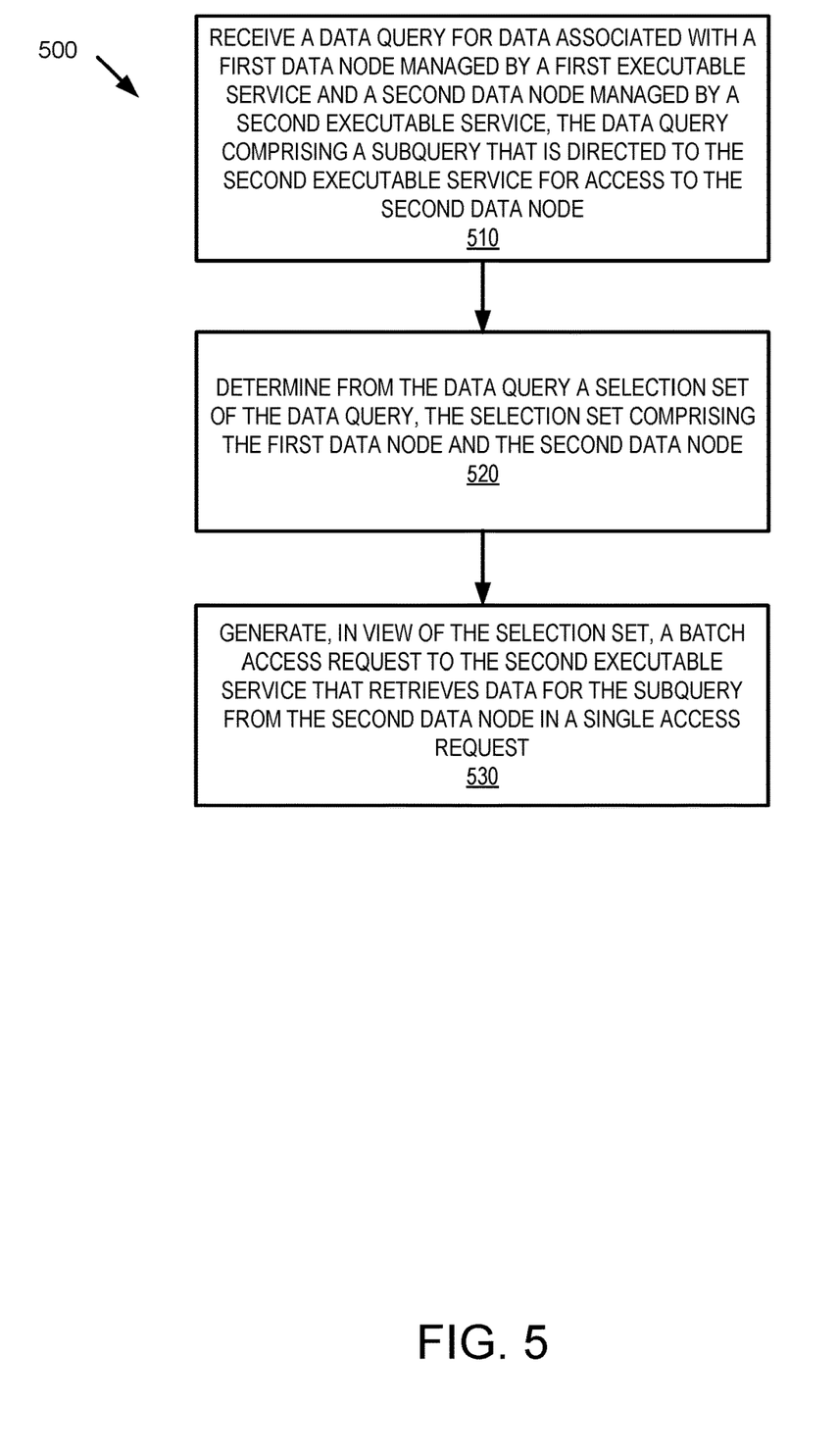
FIG. 5 is a flow diagram of a method of dynamically generating an access request, in accordance with one or more aspects of the disclosure.

FIG. 5 is a flow diagram of a method 500 of dynamically generating an access request, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by host system 140 and/or dynamic request generation 142 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a data query for data associated with a first data node managed by a first executable service and a second data node managed by a second executable service. The data query may be, for example, similar to the data query 190 discussed herein with respect to FIGS. 1-4. In some embodiments, the data query may be a graph-based query. The data query may include a subquery that is directed to the second executable service for access to the second data node. The subquery may be, for example, similar to the subquery 174 discussed herein with respect to FIGS. 1-4.

The data nodes and executable services may be, for example, similar to the data stores 135 (including first data node 135A and second data node 135B) and the services 125 (including first service 125A and second service 125B) discussed herein with respect to FIGS. 1-4. In some embodiments, the first data node may be associated with a first data store and the second data node may be associated with a second data store. The first data store may be managed by the first executable service and the second data store managed by the second executable service. The data stores may be, for example, similar to the data stores 130 (including first data store 130A and second data store 130B) discussed herein with respect to FIGS. 1-4. In some embodiments, the first and second data stores 130A, 130B may be of different types. For example, the first data store 130A may be or include a relational database and the second data store may be or include a non-relational database.

At block 520, the processing logic determines from the data query a selection set of the data query, the selection set comprising the first data node and the second data node. The selection set may be, for example, similar to the selection set 172 discussed herein with respect to FIGS. 1-4.

In some embodiments, the selection set may be further generated in view of metadata. The metadata may be, for example, similar to the metadata 162 discussed herein with respect to FIGS. 1-4. The metadata may include a mapping between the first data node and the first data store and between the second data node and the second data store.

At block 530, in view of the selection set, the processing logic generates a batch access request to the second executable service that retrieves data for the subquery from the second data node in a single access request. The batch access request may be, for example, similar to the batch access request 176 discussed herein with respect to FIGS. 1-4. In some embodiments, the processing logic may generate the batch access request dynamically without requiring further user input. In some embodiments, the selection set may be adjusted based on contents of a data cache associated with the second data node. The data cache may be, for example, similar to the cache 164 discussed herein with respect to FIGS. 1-4.

In some embodiments, an argument set may be further determined from the data query. The argument set may include a plurality of criteria for the data retrieved from the second data node. The argument set may be, for example, similar to the argument set discussed herein with respect to FIGS. 1-4. In some embodiments, dynamically generating the batch access request to the second executable service is performed further in view of the argument set. In some embodiments, dynamically generating the batch access request to the second executable service includes aggregating the plurality of criteria of the argument set to generate the single access request.

In some embodiments, the processing logic may provide a response to the data query in view of the data retrieved from the second executable service to the batch access request. The query response may be, for example, similar to the query response 195 discussed herein with respect to FIGS. 1-4. In some embodiments, at least a portion of the data retrieved from the second executable service to the batch access request may be added to the data cache.

Figure 6:
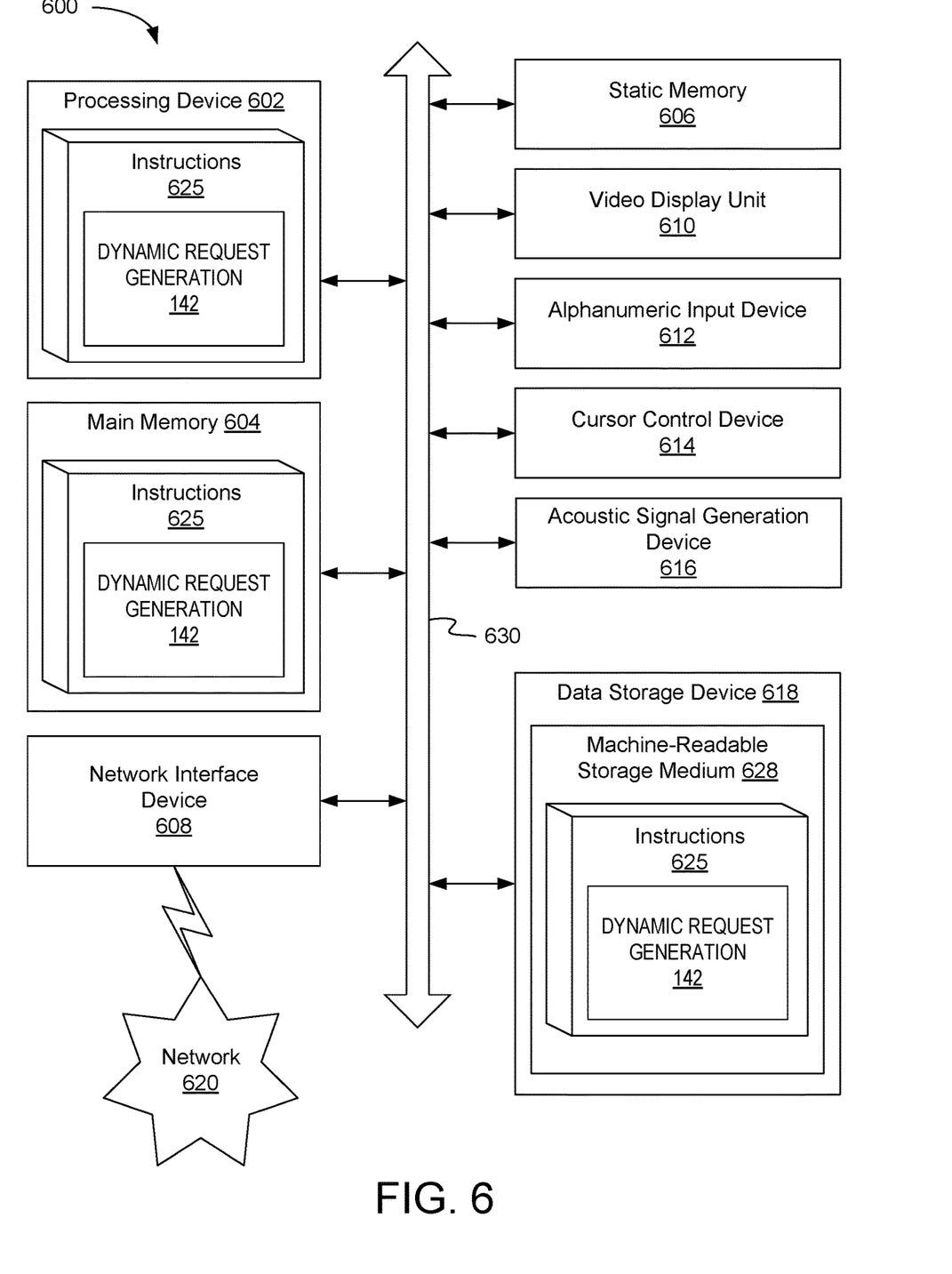
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a dynamic request generation component 142, e.g., dynamic request generation component 142 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "identifying," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a data query to retrieve first data associated with a first data node managed by a first executable service and to retrieve second data associated with a second data node managed by a second executable service, wherein the first executable service comprises first computer instructions to execute to retrieve the first data of the first data node in response to at least a portion of the data query, wherein the data query comprises a subquery that is directed to the second executable service for access to the second data node, wherein the second executable service comprises second computer instructions to execute to retrieve the second data of the second data node in response to the subquery, and wherein the subquery comprises a data request for the second data from the second executable service to be performed for each resulting first data from the first executable service;
determining from the data query a selection set of the data query, the selection set comprising the first data node and the second data node; and
aggregating query parameters of the data query to generate, by a processing device and in view of the selection set, a batch access request to the second executable service that retrieves data for the subquery from the second data node in a single access request.

2. The method of claim 1, further comprising determining from the data query an argument set of the data query, the argument set comprising a plurality of criteria for the data retrieved from the second data node, and
wherein the aggregating the query parameters of the data query to generate the batch access request to the second executable service is further in view of the argument set.

3. The method of claim 1, wherein the aggregating the query parameters of the data query to generate the batch access request to the second executable service comprises adjusting the selection set based on contents of a data cache associated with the second data node, and
wherein the method further comprises adding to the data cache at least a portion of the data retrieved from the second executable service to the batch access request.

4. The method of claim 1, further comprising generating metadata in view of a first schema associated with the first executable service and a second schema associated with the second executable service,
wherein the first and second data nodes are respectively associated with a first data store and a second data store, the metadata comprising a mapping between the first data node and the first data store and between the second data node and the second data store, and
wherein the determining of the selection set of the data query is in view of at least the metadata.

5. The method of claim 1, wherein the first data node is associated with a first data store having a first type, and
wherein the second data node is associated with a second data store having a second type that is different from the first type.

6. The method of claim 5, wherein the first data store is a relational database and the second data store is a non-relational database.

7. The method of claim 1, wherein the data query is a graph-based query.

8. An apparatus comprising:
a memory; and
a processing device, operatively coupled to the memory, to:
receive a data query to retrieve first data associated with a first data node managed by a first executable service and to retrieve second data associated with a second data node managed by a second executable service, wherein the first executable service comprises first computer instructions to execute to retrieve the first data of the first data node in response to at least a portion of the data query, wherein the data query comprises a subquery that is directed to the second executable service for access to the second data node, wherein the second executable service comprises second computer instructions to execute to retrieve the second data of the second data node in response to the subquery, and wherein the subquery comprises a data request for the second data from the second executable service to be performed for each resulting first data from the first executable service;
determine from the data query a selection set of the data query, the selection set comprising the first data node and the second data node; and
aggregate query parameters of the data query to generate, in view of the selection set, a batch access request to the second executable service that retrieves data for the subquery from the second data node in a single access request.

9. The apparatus of claim 8, wherein the processing device is further to determine from the data query an argument set of the data query, the argument set comprising a plurality of criteria for the data retrieved from the second data node, and
wherein the processing device is to aggregate the query parameters of the data query to generate the batch access request to the second executable service further in view of the argument set.

10. The apparatus of claim 8, wherein to aggregate the query parameters of the data query to generate the batch access request to the second executable service the processing device is further to adjust the selection set based on contents of a data cache associated with the second data node, and
wherein the processing device is further to add to the data cache at least a portion of the data retrieved from the second executable service to the batch access request.

11. The apparatus of claim 8, wherein the processing device is further to generate metadata in view of a first schema associated with the first executable service and a second schema associated with the second executable service,
wherein the first and second data nodes are respectively associated with a first data store and a second data store, the metadata comprising a mapping between the first data node and the first data store and between the second data node and the second data store, and
wherein the processing device is to determine the selection set of the data query in view of at least the metadata.

12. The apparatus of claim 8, wherein the first data node is associated with a first data store having a first type, and
wherein the second data node is associated with a second data store having a second type that is different from the first type.

13. The apparatus of claim 12, wherein the first data store is a relational database and the second data store is a non-relational database.

14. The apparatus of claim 8, wherein the data query is a graph-based query.

15. A non-transitory computer-readable storage medium including instructions that, when executed by a processing device, cause the processing device to:
receive a data query to retrieve first data associated with a first data node managed by a first executable service and to retrieve second data associated with a second data node managed by a second executable service, wherein the first executable service comprises first computer instructions to execute to retrieve the first data of the first data node in response to at least a portion of the data query, wherein the data query comprises a subquery that is directed to the second executable service for access to the second data node, wherein the second executable service comprises second computer instructions to execute to retrieve the second data of the second data node in response to the subquery, and wherein the subquery comprises a data request for the second data from the second executable service to be performed for each resulting first data from the first executable service;
determine from the data query a selection set of the data query, the selection set comprising the first data node and the second data node; and
aggregate query parameters of the data query to generate, by the processing device and in view of the selection set, a batch access request to the second executable service that retrieves data for the subquery from the second data node in a single access request.

16. The non-transitory computer-readable storage medium of claim 15, wherein the processing device is further to determine from the data query an argument set of the data query, the argument set comprising a plurality of criteria for the data retrieved from the second data node, and
wherein the processing device is to aggregate the query parameters of the data query to generate the batch access request to the second executable service further in view of the argument set.

17. The non-transitory computer-readable storage medium of claim 15, wherein to aggregate the query parameters of the data query to generate the batch access request to the second executable service the processing device is further to adjust the selection set based on contents of a data cache associated with the second data node, and
wherein the processing device is further to add to the data cache at least a portion of the data retrieved from the second executable service to the batch access request.

18. The non-transitory computer-readable storage medium of claim 15, wherein the processing device is further to generate metadata in view of a first schema associated with the first executable service and a second schema associated with the second executable service,
wherein the first and second data nodes are respectively associated with a first data store and a second data store, the metadata comprising a mapping between the first data node and the first data store and between the second data node and the second data store, and
wherein the processing device is to determine the selection set of the data query in view of at least the metadata.

19. The non-transitory computer-readable storage medium of claim 15, wherein the first data node is associated with a first data store having a first type, and wherein the second data node is associated with a second data store having a second type that is different from the first type.

20. The non-transitory computer-readable storage medium of claim 15, wherein the data query is a graph-based query.

\* \* \* \* \*